United States Patent [19]

Almasi et al.

[11] 3,811,119

[45] May 14, 1974

[54] METHOD FOR GENERATING HOLLOW MAGNETIC BUBBLE DOMAINS

[75] Inventors: George S. Almasi, Katonah; Bernell E. Argyle, Putnam Valley; John C. Deluca, Richmond Hills, all of N.Y.

[73] Assignee: International Business Machines Corporation, Armonk, N.Y.

[22] Filed: Dec. 29, 1972

[21] Appl. No.: 319,817

[52] U.S. Cl. .................... 340/174 TF, 340/174 AG

[51] Int. Cl. .............................................. G11c 11/14

[58] Field of Search ............................... 340/174 TF

[56] References Cited

OTHER PUBLICATIONS

Journal of Applied Physics "Observations and Properties of a New Domain: Hollow Bubble;" Vol. 42, No. 4; Mar. 15, 1971; pg 1270–1272.

*Primary Examiner*—James W. Moffitt
*Attorney, Agent, or Firm*—Sughrue, Rothwell, Mion & Macpeak

[57] ABSTRACT

By suitably pulsing a coil overlying a magnetic film or platelet in which magnetic bubble domains exist, the domains within the coil reverse their magnetization vectors with respect to bubble domains in the magnetic material outside of the coil, thus enabling the controlled generation of hollow bubbles.

5 Claims, 4 Drawing Figures

METHOD FOR GENERATING HOLLOW MAGNETIC BUBBLE DOMAINS

BACKGROUND OF THE INVENTION

1. Field of the Invention

This invention relates in general to the field of magnetic bubble domains, and more particularly to a method of generating so-called "hollow bubbles."

2. Description of the Prior Art

Hollow magnetic bubble domains, or bubbles within a bubble, comprise discrete bubbles whose magnetization vectors are normal to the surface of the orthoferrite or garnet platelet or film in which they exist and which extend in the same direction as the magnetization vector within the platelet created by an external field. These discrete, inner bubbles are surrounded by an area or ring of reverse magnetization which, in combination with the inner bubbles, constitutes the hollow bubble.

Such hollow bubbles have application and utility in a number of areas in this relatively new and rapidly expanding field of technology. For example, due to the different pole geometries of a hollow bubble as compared to a normal bubble it should be possible to distinguish them, in normal or alternative sensing schemes. In addition, the hollow bubble concept could be used to selectively and temporarily disable normal bubbles by converting them to hollow bubbles within a ring bounded "parking" area in which they would be insensitive to propagation fields.

The phenomenon of hollow bubbles has been observed by several researchers in the field, and various studies have been made of their properties. They are more fully described in an article by de Jonge et al., entitled "Observations and Properties of a New Domain: Hollow Bubble," Journal of Applied Physics, Volume 42, Number 1, Mar. 15, 1971. As noted therein, hollow bubbles sometimes appear spontaneously after heating a platelet above its Neel temperature, and they can also be created artificially by appropriately moving a current carrying loop above the platelet to stretch a strip domain and bend its ends together to form a ring or circle. Since the creation of hollow bubbles by heating is haphazard at best, and their creation by bending strip domains involves the precise and difficulty controlled movement of current loops in a unique manner for each strip domain to be bent, a need thus exists for a method of generating hollow bubbles in a controlled and well defined manner.

SUMMARY OF THE INVENTION

This invention provides a method of generating hollow magnetic bubble domains by applying an electrical pulse of predetermined magnitude and polarity to a conductive loop or coil overlying a magnetic material within which normal or conventional magnetic bubbles have been formed or propagated and which lie within the area defined by the coil. It has been found that when such a coil is suitably pulsed in this manner any normal bubbles within the coil "switch" or reverse their magnetization vectors, and the general area of the magnetic material surrounding the bubbles within the coil also switches its magnetization vector. The overall magnetic material then becomes two general areas. The first area lies outside of the coil and has a magnetization vector A, for example, while normal bubbles within the first area have magnetization vectors −A. The second area lies within and directly below the coil and has a magnetization vector −A, while the switched bubbles within the second area have magnetization vectors A. This second area, including the switched bubbles within it, may thus be termed a hollow bubble. The outline of the second area is generally irregular or wavy, and depends on the coil configuration, the number of switched bubbles contained within it, etc.

DESCRIPTION OF THE PREFERRED EMBODIMENT

Figure 1:
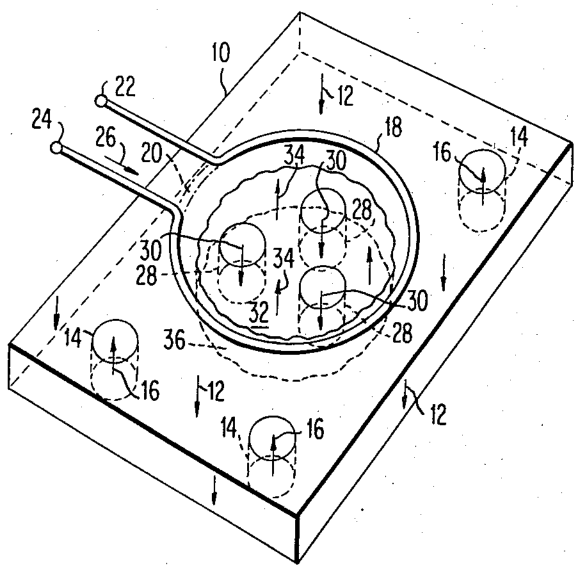
FIG. 1 shows a perspective view of a magnetic medium having therein a hollow bubble generated according to the teachings of the invention.

Referring to FIG. 1, a magnetic medium 10 of orthoferrite, garnet, or other suitable material is shown as having a magnetization normal to the surface and in a downward direction as indicated by arrows 12. The magnetization is induced by an applied field from an external source, not shown, as is well known in the art. Normal or conventional magnetic bubble domains 14 are shown as lying within the magnetic medium 10, and their magnetization is reversed with respect to the surrounding area as indicated by upwardly directed arrows 16. The bubble domains 14 may be propagated and controlled within the platelet in any one of a number of ways well known in the art, not essential to the present invention.

Overlying the material 10 and adjacent with the upper surface thereof is a current conducting loop or coil 18. The coil may be in the form of a single, open turn as shown by the solid lines, or may comprise a plurality of closed turns as shown schematically by broken lines 20. In a working embodiment of the invention, for example, hollow bubbles were generated in a [111] oriented $Y_3Ga_{1.1}Fe_{3.9}O_{12}$ film grown epitaxially on $Dy_{0.5}Gd_{2.5}Ga_5O_{12}$ substrate. The film exhibited $h = 5.2$ $\mu$m, $4\pi M_S = 50$ G, $H_A \approx 600$ Oe and $g = 2.19$. Hollow bubbles were formed using a coil 2 milimeters in diameter and formed of ten turns of number 42 copper wire.

In accordance with the invention, it has been found that if normal bubbles such as 14 exist in the medium 10 within the area defined by the coil 18, and a current pulse of sufficient amplitude is applied across coil terminals 22, 24 to cause current flow in the direction shown by arrow 26, such bubbles 28 switch or reverse their magnetization to the direction indicated by arrows 30. The duration of the pulse is generally in the range of $10^{-7}$–$10^{-3}$ seconds although other durations may work well. Also, a plurality of pulses may be applied instead of a single pulse. At the same time, the area or domain 32 of the medium surrounding the bubbles 28 and within the coil also reverses its direction of magnetization as indicated by arrows 34. The domain wall 36 between the area 32 and the remainder of the medium 10 generally assumes a somewhat wavy configuration as shown. The area 32 and the switched bubbles 28 within it constitute a hollow bubble.

By reducing the size of the coil 18 it should also be possible to switch the magnetization of a single conventional bubble centered within the coil thus generating a hollow bubble having a single reversely magnetized bubble domain within it.

A hollow bubble may also be switched back or returned to its original state by applying a pulse of reversed polarity to the coil.

Figure 2A:
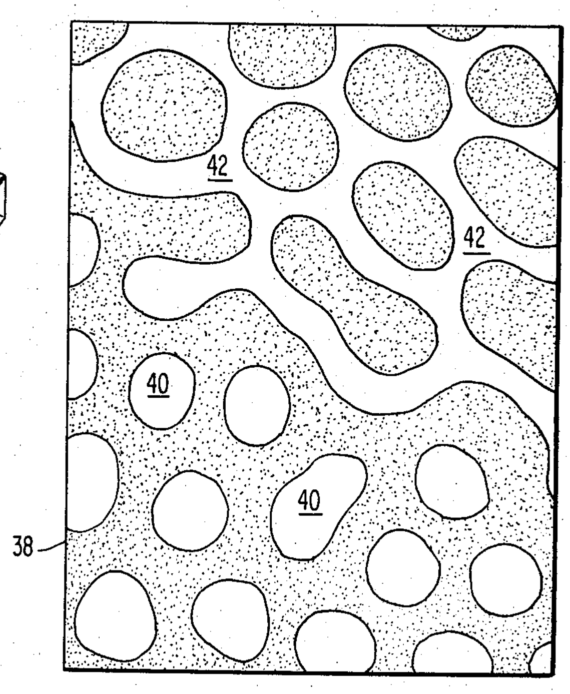
FIGS. 2A, 2B and 2C show top views of a magnetic medium with magnetic domains therein before any current is applied to an overlying coil, after the application of a current pulse of one polarity, and after the application of a current pulse of reversed polarity, respectively.
Figure 2B:
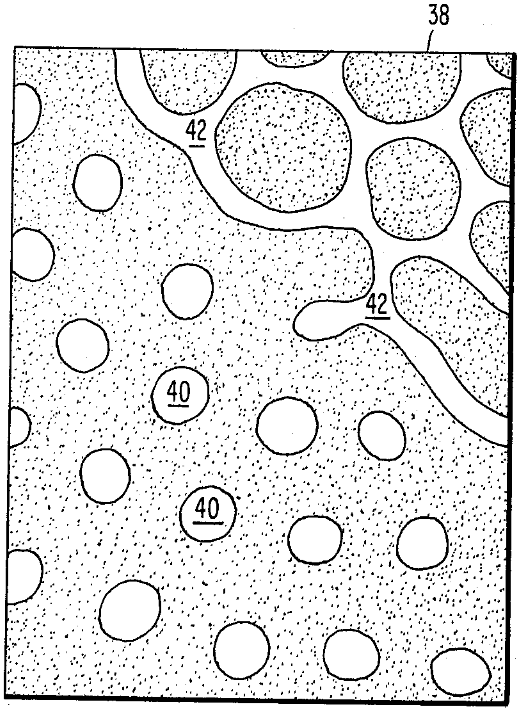

FIG. 2A shows an area of a magnetic medium 38 lying within and below a pulsing coil, not shown, before any switching pulses are applied to the coil. It will be observed that isolated and somewhat enlarged individual bubble domains 40 are present, along with a honeycomb pattern 42 of strip domains. FIG. 2B shows the same material area after a pulse of current producing 9.1 oersted of field has been applied to the coil whose polarity creates a magnetic field normal to the medium and directed into the drawing. As may be seen, this increased field has the effect of shrinking the bubble domains 40 and the honeycomb pattern 42, as is well known in the art.

Figure 2C:
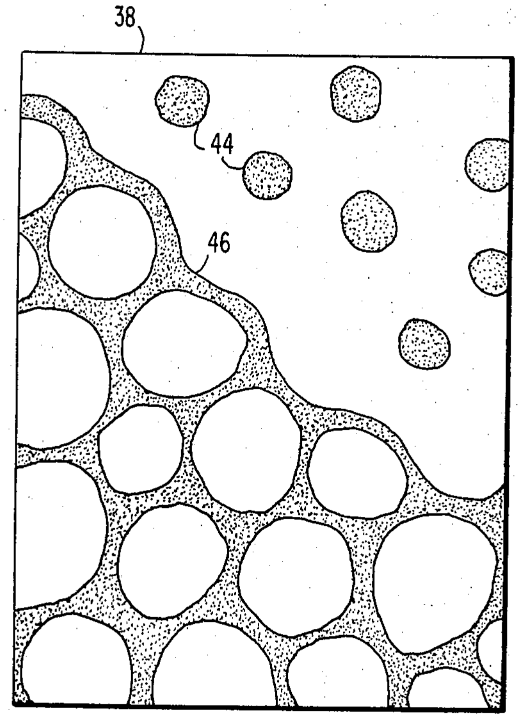

FIG. 2C shows the medium 38 after a current pulse producing a field of 12.3 Oe of reversed polarity with respect to the pulse applied in connection with FIG. 2B has been applied to the coil. As is clearly shown, the entire magnetization pattern within the medium has been completely reversed. The honeycomb pattern 42 in the upper right of FIGS. 2A and 2B now becomes an area containing discrete, isolated bubble domains 44 whose polarity or magnetization is opposite that of the bubble domains 40 in FIGS. 2A and 2B. Similarly, the area containing the bubble domains 40 in the lower left of FIGS. 2A and 2B now appears as a honeycomb pattern 46 of reversed polarity with respect to the honeycomb pattern 42 of FIGS. 2A and 2B.

While the invention has been described in connection with a specific embodiment thereof, many variations and modifications will be apparent to those skilled in the art and same are intended to be included within the purview of the invention as expressed in the appended claims. For example, the switching field could be developed in a number of ways other than with the disclosed current loop or coil. A portion of the medium could be placed in the air gap of a suitably designed electromagnet, as one example, whose energizing coil could then be appropriately pulsed to generate the desired local field within the medium. Additionally, a high permeability material could be placed within the vicinity of the pulsing coil to enhance the pulsing field, and to more suitably localize it.

What is claimed is:

1. A method of generating a hollow magnetic bubble domain in a magnetic material having a magnetization in a first direction normal to the surface of said material and containing therein at least one conventional magnetic bubble domain having a magnetization in a second direction opposite to said first direction, comprising:

establishing a magnetic field in said second direction in a localized area of the magnetic material surrounding said at least one conventional magnetic bubble domain for a short period of time, whereby said at least one conventional magnetic bubble domain reverses its direction of magnetization to said first direction and the localized area of the magnetic material reverses its direction of magnetization to said second direction.

2. A method as defined in claim 1 wherein the magnetic field is established by applying a current pulse of predetermined magnitude, polarity and duration to an electrically conductive loop disposed adjacent the surface of said magnetic material and substantially surrounding the localized area.

3. A method as defined in claim 2 wherein the loop is disposed on top of the magnetic material.

4. A method as defined in claim 2 wherein the loop is an open loop.

5. A method as defined in claim 2 wherein the loop is a closed coil.

* * * * *